United States Patent [19]
Bergmeister et al.

[11] 3,773,699
[45] Nov. 20, 1973

[54] PROCESS EMPLOYING A REDOX CATALYST SYSTEM FOR MANUFACTURING LINKED ETHYLENE VINYL GRAFTED COPOLYMER DISPERSIONS

[75] Inventors: Eduard Bergmeister; Erwin Lieb; Hubert Wiest, all of Burghausen-Obb., Germany

[73] Assignee: Wacker-Chemie G.m.b.H., Munich, Bavaria, Germany

[22] Filed: Dec. 3, 1971

[21] Appl. No.: 204,712

Related U.S. Application Data

[63] Continuation of Ser. No. 881,317, Dec. 1, 1969, abandoned.

[30] Foreign Application Priority Data

Jan. 9, 1969 Germany.................. P 19 00 967.7

[52] U.S. Cl. 260/29.6 RB, 117/161, 260/29.6 MM, 260/31.2 R, 260/33.4 PQ, 260/878 R
[51] Int. Cl. ....................... C08f 45/36, C08f 15/00
[58] Field of Search ................ 260/878 R, 29.6 RB, 260/29.6 MM

[56] References Cited
UNITED STATES PATENTS

| | | | |
|---|---|---|---|
| 3,506,630 | 4/1970 | Beier et al. | 260/87.3 |
| 3,277,210 | 10/1966 | Mirabile et al. | 260/878 R |
| 3,358,054 | 12/1967 | Bonn et al. | 260/878 R |

Primary Examiner—Harry Wong, Jr.
Attorney—Donald Malcolm

[57] ABSTRACT

Process employing a redox catalyst system for manufacturing grafted ethylene vinyl copolymer emulsions which comprises preparing a stable uncoagulated ethylene-vinyl acetate copolymer backbone emulsion having a weight percentage ratio of ethylene constituent from 2 to 50, and reacting said backbone emulsions with a graftable olefinic unsaturated compound at a temperature of − 20 to + 60°C in the presence of a colloidally dispersed previous metal of the VIII subgroup of the periodic system and a member of the group consisting of inorganic and organic per compounds, hydrogen and hydrogen-yielding compounds.

3 Claims, No Drawings

PROCESS EMPLOYING A REDOX CATALYST SYSTEM FOR MANUFACTURING LINKED ETHYLENE VINYL GRAFTED COPOLYMER DISPERSIONS

This is a continuation of application Ser. No. 881,317, filed Dec. 1, 1969 now abandoned.

BACKGROUND OF THE INVENTION

It is known that products with improved properties are obtained by grafting various olefinic unsaturated compounds onto ethylene vinyl acetate copolymers. This can be done either by stepping the ethylene vinyl acetate copolymer with the olefinic unsaturated monomer, or dissolved in it, whereupon grafting is done with the addition of a radical component. It is known also how to graft unsaturated monomers onto ethylene vinyl acetate copolymers, which are present either in the form of solutions in organic solvents, or aqueous suspensions, or aqueous emulsions.

However, grafting onto aqueous ethylene vinyl acetate copolymer emulsions in such a way as to obtain stable, non-coagulating, high-percentage emulsions presents difficulties. What is obtained are emulsions which are very unstable, which are incompatible with pigments, and which contain coagulates. They frequently coagulate even during the graft polymerization. Furthermore, the grafted polymerization products are inhomogeneous, i.e. substantial portions of homopolymerizates of the grafting monomer form along with the grafted ethylene vinyl acetate copolymerizates.

As is suggested in French Pat. No. 1,373,236, Example 21, grafting of vinyl chloride onto an ethylene vinyl acetate emulsion results in non-coagulating emulsions only when the solid content is low and when large quantities of emulsifier are used. Even so, these emulsions are of slight mechanical stability, they have a poor tolerance to pigments, and exhibit a completely inadequate water resistance of the polymer film. The latter is caused by the use of large quantities of emulsifier which are required for that process. However, the kind of emulsions used as binding agents for painting, adhesives, or coatings, requires a high solid content, of about 50 percent, high stability, a good tolerance to pigments, And a good water resistance.

German Pat. No. 1,133,130 describes a redox catalyst system for the emulsion polyermization of olefinic unsaturated compounds and the copolymerization of such compounds. The redox catalyst systems used for that purpose consist of organic or inorganic peroxide compounds, hydrogen and colloidally distributed precious metals of group VIII of the periodic system, and, if necessary, of heavy metal salts.

SUMMARY OF THE INVENTION

The subject of the present invention is the use of a redox system or inorganic or organic per compound, hydrogen or hydrogen-yielding compounds, and colloidally distributed precious metals of sub-group VIII of the periodic system as catalyst, for the manufacture of stable, aqueous polymerization emulsions, while ethylene unsaturated compounds are grafted onto ethylene vinyl acetate copolymer backbone emulsions having a 2 to 50 weight percentage ratio of ethylene which, if necessary, may also contain one or several monomers copolymerized up to 30 percent of their weight, at temperatures ranging from $-20$ to $+60°C$, preferably between $+10$ and $+40°C$.

The invention makes it possible to obtain stable, non-coagulating emulsions with solid contents ranging from 45 to 65 weight percent, and having a good tolerance to pigments at the same time. Furthermore, the volume achieved is nearly quantitative, and therefore the accruing emulsions are almost free of residual monomers.

A further positive result of this process is a grafted polymerization product containing just slight quantities of homopolymeride of the grafted monomer. Consequently, further processing produces homogeneous polymer films capable of exhibiting greatly improved properties in the presence of just slight quantities of a grafted monomer.

There is another advantage: no additives of emulsifiers or protective colloids are required to effect grafting according to the process of the invention for the purpose of obtaining stable emulsions. Emulsions of particularly good water resistance are therefore obtained.

DESCRIPTION OF THE PREFERRED EMBODIMENTS

Acrylic acid esters of alcohols with one to 16 carbon atoms, styrol and acrylic nitrile are particularly suited for use as graftable olefinic unsaturated compounds. Other monomers are substituted styrols, for instance methyl styrol; vinyl chloride; olefines having two to eight carbon atoms and diolefines having from four to eight carbon atoms; vinyl esters of straight-chained or branch-chained carboxylic acids having from two to 18 carbon atoms; esters of acrylic or methacrylic acid with monoalcohols having from one to 16 carbon atoms or dialcohols having from two to eight carbon atoms; mono- or diesters of maleic, fumaric, conic acid with mono-alcohols having from one to 16 carbon atoms, or dialcohols having from two to eight carbon atoms; $\alpha, \beta$-unsaturated mono- and dicarboxylic acids such as acrylic, methacrylic, crotonic, fumaric and maleic acids as well as the amides or the N-methylol compounds of these acids. Mixtures of these monomers can also be grafted. The olefinic unsaturated compounds, in quantity ratios from 2 to 45 weight percentage, are grafted onto the polymerization content of the backbone emulsion. Quantities of 5 to 30 weight percent are recommended.

The grafting can be carried out by introducing the whole quantity of the monomer which is to be grafted onto the ethylene vinyl acetate emulsion, whereupon the graft polymerization is started by adding the catalyst system. However, the monomer to be grafted or the monomeric mixture can also be added continuously in the course of the grafting process. If necessary, more water and/or catalyst solutions may also be added.

Any otherwise applicable inorganic per compounds, for instance hydrogen peroxide, sodium, potassium and ammonium persulfate and alkali metal perborate, and organic per compounds, for instance tertiary butyl hydroperoxide, cumolhydroperoxide, dibutyl and tertiary butyl peroxide, benzoyl peroxide, as well as lauryl peroxide and acetyl cyclohexansulfonyl peroxide can be used as per compounds.

It is preferable to supply per compounds at a ratio of 0.001 to 0.6 weight percent to the monomer which is to be grafted.

The partial pressure of the hydrogen is preferably to be exerted at 0.1 to 10 atmospheres.

Regarding colloidally distributed precious metals, it is palladium, platinum and rhodium which are mainly of interest. Quantities of 0.00001 to 0.001 weight percent in ratio to the monomer to be grafted are recommended for that purpose.

It has further turned out that metal ions of iron, copper, nickel, cobalt, chromium, molybdenum, vanadium, cerium, alone or in a mixture in quantities of 0.01 to 10 g-atoms per one g-atom of the precious metal, preferably 0.1 to 5 g-atoms per one g-atom of the precious metal, may also be added to the redox catalyst system, bearing in mind that the weight constituents of the metal ions must not exceed 0.001 weight percentage ratio of the supplied monomers. Excellent results are obtained by following this formula.

Ethylene vinyl acetate copolymer emulsions of standard manufacture, which in themselves meet the requirements of anti-coagulants, tolerance to pigments, and mechanical stability with regard to their emulsion properties, are used as backbone emulsions for the graft polymerization.

The type of emulsions suitable for that purpose are thos containing emulsifiers only (non-ionogenic, anionic or cationic), or protective colloids only (for instance polyvinyl alcohol, partly saponified polyvinyl acetate, water-soluble cellulose derivatives, open-chained or cyclic N-vinyl-lactams, polyacrylic acids or water-soluble copolymerizates of acrylic acid and acrylamide). Still, ethylene vinyl acetate copolymer emulsions containing a number of emulsifiers or protective colloids, emulsifiers and protective colloids as well, can also be used. Coarse, medium, or finely dispersed ethylene vinyl acetate emulsions may be employed for the grafting.

The ratio of ethylene to the backbone emulsion may amount to from 2 to 50 weight percent in relation to the polymerizate. In addition to ethylene and vinyl acetate the backbone emulsion may contain up to 30 weight percent of other copolymerized monomers, in relation to the polymerizate, like vinyl chloride, vinyl esters of straight-chained and branch-chained carboxylic acids having from three to 18 carbon atoms; esters of acrylic acid, monoesters and diesters of maleic, fumaric, and itaconic acid having monoalcohols with one to 16 carbon atoms or dialcohols with a count of two to eight carbon atoms; acrylic acid, methacrylic acid, crotonic acid, maleic acid, fumaric acid, itaconic acid and amides or N-methylol amides of such acids; vinyl sulfonate as well as mixtures of these monomers.

There is an advantage of manufacturing the ethylene vinyl acetate copolymer backbone emulsions together with the redox catalyst system in accordance with German Pat. No. 1,133,130.

The emulsions manufactured according to the invention are particularly suited as adhesives for plastic materials, wood, papter, rubber, leather, metal, as sound-absorbing materials, as coatings, hot-printing enamels, as binders for paints, for wax emulsions, as permanently pure textile- and paper fleece binders, additives for cement as well as for soil improvement agents and finishings. Furthermore, powders which can be redispersed in water can be prepared by means of the emulsions.

Example 1 (Initial Emulsion)

4.7 kg of water, 60 g of poly-N-vinyl pyrrolidone, 20g of hydroxy propyl methyl cellulose, 150 g of a nonyl phenol polyethylene glycol ether averaging 23 ethylene oxide units per molecule, 10 g of tetrapropylene benzol sulfonate, 20 mililiters of an aqueous palladium solution with a 0.1 weight percentage, and 1.0 kg of vinyl acetate are placed in a 15 liter pressure autoclave equipped with an agitator, a heat transfer jacket and conduits for the dosaging of liquids and gases. After displacing air by means of nitrogen, the contents of the autoclave are heated to 40°C, under stirring continuing to the end of the polymerization, whereupon ethylene is added to an equalizing pressure of 55 atmospheres absolute, as well as a solution of 5 g of potassium persulfate in 150 mililiters of water, and then the polymerization is started by pressing in 2 atmospheres of hydrogen. Finally, in the course of 10 hours, a solution of 20 g of potassium persulfate in 500 g of water is dosed in, and separately 3.5 kg of vinyl acetate. The inside temperature is maintained at 40°C all during the polymerization. Additional polymerization is conducted for another 3 hours at a temperature of 50 to 55°C after the dosing. The result is a stable, uncoagulated vinyl acetate ethylene emulsion with an ethylene content of 25 percent which then dries into a very soft, sticky film. The film is fully soluble in tertiary butanol.

Example 2

8 kg of the vinyl acetate ethylene copolymer emulsion of the type given in Example 1, standardized at 50 weight percentage of solid contents, 1 kg of styrol and 1 liter of water are stirred together in a 15 liter pressure autoclave equipped with a stirrer, with provision for a heat transfer jacket and means for dosaging. Subsequently the emulsion is purified of oxygen by a rinsing with nitrogen, 8 mililiters of a palladium solution with an 0.1 percent content and 10 g of potassium persulfate are added and the graft polymerization is started under a pressure of 2 atmospheres of hydrogen. In the course of the 4-hour-long polymerization the mixture is constantly stirred and the inside temperature is maintained at 20°C. The obtained product is a stable, uncoagulated, 50 percent-content emulsion, which then dries up to form a flexible, non-sticky film of high stability. As opposed to Example 1, more than 70 percent in weight of the film are insoluble in tertiary butanol.

Example 3 (Comparative Example)

The same procedure is followed as in Example 2, except that only potassium persulfate without the palladium solution and the hydrogen are used as the catalyst and polymerization was at 60°C. The thus obtained emulsion is almost entirely coagulated and unusable.

Example 4

Following the same procedure as described in Example 2, 10 kg of emulsion per Example 1, 600 g of acrylic nitrile and 600 g of water are stirred together. Next the emulsion is purified of oxygen by a rinsing with nitrogen, and 10 ml of 0.1 percent palladium solution and 10 g of potassium persulfate are added to it. The graft polymerization is started by exerting a pressure of 2 atmospheres of hydrogen, with agitation for 4 hours at a temperature of 20°C. The thus obtained emulsion is uncoagulated and stable, it dries up to form a clear, non-sticky film of high resistance.

Example 5 (Comparative Example)

The same procedure is followed as in Example 4, except that a catalyst system consisting of 10 g of tertiary butyl hydroperoxide is used and during the polymerization 7 g of rongalite "C" are used as a reducer (temperature 40° C). The polymerization lasts 6 hours. The emulsion is highly coagulated.

Example 6 (Backbone Emulsion)

3.8 liters of water, 250 g of nonyl phenol polyethylene glycolether, 30 g of a tetrapropylbenzene sulfonate, 20 g of sodium salt of vinyl sulfonic acid, 450 g of vinyl acetate, 20 ml of a 0.1 percent palladium solution, and 5 g of potassium persulfate are placed in a 15 liter pressure autoclave equipped with a stirrer, heat transfer jacket and conduits for dosaging in of liquids and gases. After carefully removing the air oxygen, the mixture is heated to 50° C under constant stirring and ethylene is forced in under a pressure of 35 atmospheres. Polymerization is started by forcing in 2 atmospheres of hydrogen. In the course of 5 hours 4,550 g of vinyl acetate and 80 g of acrylic acid, as well as 20 g of sodium vinyl sulfonate and 20 g of potassium persulfate, dissolved in 600 ml of water, are dosed in. The polymerization temperature is maintained at 50° C. Another 5 g of potassium persulfate are added as an after dose and polymerized out for another 4 hours. What is obtained is a mechanically stable, uncoagulated and pigment-tolerant emulsion with an ethylene content of 15 percent whose slightly sticky, soft film is fully soluble in tertiary butanol and in ethylene acetate.

Example 7

8 kg of vinyl acetate-ethylene emulsion, per Example 6, 1.3 kg of water, 10 g of potassium persulfate and 8 ml of an 0.1 percent palladium solution are placed in a 15 liter autoclave with stirrer, jacket cooling and the facility for additional dosaging, whereupon 2 atmospheres of hydrogen are pressed in after rinsing with nitrogen, and 1.4 kg of styrol are dosed in during the course of 3 hours. The temperature is maintained at 20° C. After dosaging there are another 2 hours of polymerization. The product is an uncoagulated, stable, 50 percent-content emulsion.

Example 8 (Comparative Example)

In a manner analogous to Example 7, an emulsion was produced with potassium persulfate only as the catalyst, at a temperature of 70° C. The pigment tolerance of this emulsion is poor and the film made from it is milky cloudy and brittle.

Example 9

10 kg of the vinyl acetate-ethylene emulsion of Example 6 and 500 g of acrylic nitrile are mixed by stirring in a 15 liter autoclave, purified by air oxygen, and supplemented by the addition of 8 ml of a 0.1 percent palladium solution as well as 10 g of potassium persulfate in 250 g of water. The grafting is started by pressing in 2 atmospheres of hydrogen. The temperature is maintained constant for 4 hours at 25° C under constant stirring. The product obtained is a stable, uncoagulated emulsion with a 51 percent solid content whose film is over 90 percent insoluble in ethyl acetate.

Example 10 (Comparative Example)

In a manner analogous to Example 9, an emulsion is produced with the use of 10 g of ammonium persulfate and 5 g of sodium bisulfite, which were dosed in the course of 5 hours at a temperature of 50° C. This batch coagulated.

Example 11

10 kg of vinyl acetate-ethylene copolymer emulsion per Example 6, 10 g of potassium persulfate, 8 ml of a 0.1 percent palladium solution and 50 mg of ammonium ferric sulfate are present in a 15 liter autoclave equipped with a stirrer, jacket cooling and dosaging facilities. After purifying the contents of the air oxygen, 1.6 kg or vinyl chloride are added and the graft polymerization is started by forcing in 2 atmospheres of hydrogen under constant stirring. The temperature is meanwhile brought to 35° C and maintained for 5 hours at this level. The product is a stable, pigment-tolerant and non-coagulating emulsion with a solid content of 57 percent, and with a flexible film which is almost entirely insoluble in tertiary butanol, as compared to the backbone raw product emulsion, shows a high stability and a very low degree of turgidity under storage in water.

Example 12

3.3 kg of vinyl laurate were grafted following the procedure indicated in Example 11 with the addition of 1 kg of water. The product obtained is a stable, non-coagulating emulsion that dries up into a very sticky film. It can be used as an adhesive paste.

TABLE 1

Emulsion Characteristics

| Ex. No. | Kind of Example | Coagulate Condition | Pigment Tolerance | Shearing Stability + |
|---|---|---|---|---|
| 1 | Backbone Emulsion for the grafting | non-coagulating | Excellent | Excellent |
| 2 | Graft Emulsion per invention | non-coagulating | Excellent | Excellent |
| 3 | Graft Emulsion, Comperative Exam. | almost fully coagulated | | |
| 4 | Graft Emulsion per invention | non-coagulating | Excellent | Excellent |
| 5 | Graft Emulsion Comperative Exam. | high coagulation contents | | |
| 6 | Backbone Emulsion for the grafting | non-coagulating | Excellent | Excellent |
| 7 | Graft Emulsion per invention | non-coagulating | Excellent | Excellent |
| 8 | Graft Emulsion Comparison | non-coagulating | Poor | Coagulated |
| 9 | Graft Emulsion per invention | non-coagulating | Excellent | Excellent |
| 10 | Graft Emulsion Comparison | coagulated | | |
| 11 | Graft Emulsion per invention | non-coagulating | Excellent | Excellent |
| 12 | Graft Emulsion per invention | non-coagulating | Excellent | Excellent |

+ 200 grams of the emulsion on a 500 ccm glass beaker are stirred with a serrated stirrer for 30 minutes at 2000 RPM, whereupon the emulsion is examined for changes and coagulates.

TABLE 2

Characteristics of the Films Produced from the Emulsion

| Appearance | Surface Quality | Elongation | Tensible Strength kg/cm | Absorption of Water % + |
|---|---|---|---|---|
| Transparent Glossy | adhesive | >4000% | 2.0 | 60 |
| Transparent | non-adhesive | 500% | 120.0 | 10 |

| | | | | |
|---|---|---|---|---|
| Transparent | non-adhesive | 1600% | 20 | 20 |
| Transparent, High Gloss | slightly adhesive | 2000% | 8 | 120 |
| Transparent, Glossy | non-adhesive | 600% | 80 | 20 |
| Milky Cloudy, | non-adhesive | 700% | 55 | 40 |
| Transparent, Glossy | non-adhesive | 1200% | 40 | 60 |
| Transparent, Glossy | non-adhesive | 400% | 140 | 14 |
| Transparent, Glossy | very adhesive | | | 30 |

+ 200μ strong emulsion films are placed for 24 hours in distilled water and the absorption of water is then determined.

The invention claimed is:

1. Process for manufacturing grafted aqueous vinyl copolymer emulsions which comprises preparing a stable uncoagulated ethylene-vinyl acetate copolymer backbone emulsion having a weight percentage ratio of ethylene constituent from 2 to 50, and reacting said backbone emulsion with from 2 to 45 weight percent of the backbone emulsion of a graftable olefinic unsaturated compound selected from the group consisting of styrol, acrylic nitrile, acrylic acid ester of alcohols having one to 16 carbon atoms and vinyl chloride at a temperature of $-20$ to $+60°C$ in the presence of a redox catalyst system consisting of a colloidally dispersed precious metal selected from the group consisting of palladium, platinum and rhodium in a quantity of 0.00001 to 0.001 weight percent in ratio to the monomer to be grafted and a member selected from the group consisting of inorganic and organic per compounds in the quantity of 0.001 to 0.6 weight percent to the monomer which is to be grafted and hydrogen at a partial pressure of 0.1 to 10 atmospheres.

2. Process according to claim 1, in which said per compound is selected from the group consisting of potassium persulfate and ammonium ferric sulphate.

3. Process according to claim 1, in which said catalyst also contains ions of metals selected from the group consisting of iron, copper, nickel, cobalt, chromium, molybdenum, vanadium and cerium, in quantities ranging from 0.01 to 10 g-atoms per g-atom of the precious metal employed, the weight percentage of said metal ions not exceeding 0.001 weight percent in relation to the olefinic unsaturated compounds employed.

* * * * *